United States Patent [19]

Notta et al.

[11] Patent Number: 5,600,876
[45] Date of Patent: Feb. 11, 1997

[54] METHOD OF ASSEMBLY FOR VEHICLE SEAT LATCH INCORPORATING BACKLASH REDUCTION MECHANISM

[75] Inventors: Adolf Notta, Toronto; Gulam Premji, Mississauga, both of Canada

[73] Assignee: Bertrand Faure Ltd., Mississauga, Canada

[21] Appl. No.: 426,559

[22] Filed: Apr. 13, 1995

Related U.S. Application Data

[62] Division of Ser. No. 15,794, Feb. 10, 1993, abandoned.

[30] Foreign Application Priority Data

Jul. 31, 1992 [CA] Canada ................................... 2075103

[51] Int. Cl.$^6$ ........................................................ B23P 11/00
[52] U.S. Cl. .................................. 29/11; 29/434; 29/464; 29/467; 29/469; 29/893.1; 16/325; 16/333; 297/366
[58] Field of Search .............................. 29/11, 434, 464, 29/467, 469, 893.1; 297/366, 367, 368, 369; 16/325, 333, 380, DIG. 16

[56] References Cited

U.S. PATENT DOCUMENTS

| | | |
|---|---|---|
| 1,549,845 | 8/1925 | Munz . |
| 3,479,088 | 11/1969 | Bonnaud . |
| 3,788,698 | 1/1974 | Perkins .................................. 297/373 |
| 4,223,947 | 9/1980 | Cremer ................................... 297/367 |
| 4,227,741 | 10/1980 | Gross et al. ........................... 297/362 |
| 4,732,425 | 3/1988 | Terada et al. ......................... 297/362 |
| 4,836,608 | 6/1989 | Sugiyama ............................... 297/367 |
| 4,946,223 | 8/1990 | Croft et al. ........................... 297/367 |
| 4,995,669 | 2/1991 | Croft ...................................... 297/379 |
| 5,156,439 | 10/1992 | Idlani et al. ........................... 297/367 |
| 5,205,609 | 4/1993 | Notta et al. ........................... 297/367 |
| 5,340,195 | 8/1994 | Notta .................................... 297/354.1 |
| 5,474,360 | 12/1995 | Chang .................................... 297/367 |

FOREIGN PATENT DOCUMENTS 1185512 4/1985 Canada .

*Primary Examiner*—S. Thomas Hughes
*Attorney, Agent, or Firm*—Patrick J. Hofbauer

[57] ABSTRACT

A backlash reduction mechanism for incorporation into a selectively latchable vehicle seat hinge assembly for reducing the backlash between a plurality of interconnecting movably operative latch members positioned seriatim with respect to one another in the vehicle seat hinge assembly and method for producing the mechanism are disclosed. The latch members are retained in interposed relation between first and second hinge plates. One of the latch members, a manually operable lever means, is rotatably mounted about a second pivot axis on an eccentrically operative rotatably adjustable backlash reduction means, which is in turn rotatably mounted on the first and second hinge plates about a first pivot axis. The eccentrically operative rotatably adjustable backlash reduction means is for achieving selective adjustment of the relative positioning of one or more of the latch members to one another, wherein, when eccentrically operative rotatably adjustable backlash reduction means is rotated about the first pivot axis, it interacts with the latch member mounted thereon such that latch member is axially moved generally toward the next latch member positioned seriatim therewith, thereby to cause selective reduction in the amount of backlash between these two latch members and subsequently between other juxtaposed ones of the latch members.

14 Claims, 4 Drawing Sheets

METHOD OF ASSEMBLY FOR VEHICLE SEAT LATCH INCORPORATING BACKLASH REDUCTION MECHANISM

This application is a division of application Ser. 08/015, 794, filed Feb. 10, 1993, which application is now abandoned.

FIELD OF THE INVENTION

This invention relates to hinge assemblies in vehicle seats and more particularly to release mechanisms for such hinge assemblies. Further, this invention relates to methods of reducing backlash in such release mechanisms.

BACKGROUND OF THE INVENTION

In a vehicle seat hinge assembly, it is common to have several components that comprise the hinge assembly, including the components that provide for the angle of the seatback to be controllably adjustable. Most of these components are mass produced from sheet metal by stamping or similar processes. For any one particular component produced in this manner, a range of tolerances in the order of 0.010" can be expected. Resultingly, replications of the same component will be of slightly different sizes. When the vehicle seat hinge assembly is assembled, the various components are placed seriatim one to another and, resultingly, the aforesaid tolerances of the various parts stack. Thus, the overall dimensions of the assembled vehicle seat hinge assembly may vary by up to about 0.030", or more.

In a vehicle seat hinge assembly having a manually operable release mechanism, the lever arm for releasing the seatback and allowing it to be angularly adjusted and the seatback hinge arm that is rigidly attached to the seatback are generally located at extreme opposite ends of the vehicle seat hinge assembly, with the remaining components located therebetween. The stacked tolerances of all of these components can vary considerably from one replication of a given hinge assembly to the next replication of the same type of hinge assembly, and such stacking of tolerances is most apparent at the extreme opposite ends of the vehicle seat hinge assembly. Further, the tolerances of all of the components in the vehicle seat hinge assembly can stack both negatively and positively to thereby cause an unpredictable angular variation in the orientation of the hand operated lever arm and the seatback hinge arm in either angular direction. This, of course, amplifies the aforesaid angular variation of the lever arm twofold.

Further compounding the problem is the rotatable mounting of the hand operated lever arm, which means that a variation of perhaps up to about 0.025" at the interface between the lever arm and the next serially arranged component that contacts it, typically a latch pawl, can translate to a difference of about 30° to 40° or even more in the angular orientation of the lever arm. An angular variation of this magnitude is unacceptable for aesthetic and functional reasons, and can cause, for example, design problems in the seat frame or seat trim components which must accommodate placement and movement of the lever arm in the finished seat assembly. A range of angular variation of the lever arm of about 2° or 3° is considered acceptable by vehicle manufacturers. The angle of orientation of the lever arm is preferably substantially horizontal, but need not be so.

When the various parts of a seat hinge assembly are assembled, there is an inherent space, known as "clearance" between each part and any part mating therewith. Clearance is due to differences in size between mating parts. Clearances between the mating parts, such as gear teeth, cause a condition known as backlash. Backlash results, for instance when one of the gears in a gear system is rotated and the clearance between any of the mating gears is eliminated such that all of the gears are contacting mating gears so as to allow for concurrent rotational movement of all of the gears. Backlash is a necessary characteristic of all mating gears, and is needed to give the gears enough freedom to mesh and release during the relative motion between any two mating gears.

"Lost motion" is a term used to refer to the amount of travel of a part, typically an actuating means such as a handle or a lever, in a gear system or similar that occurs due to backlash. Basically, there is an amount of motion required in order to temporarily "take up" the clearances between mating parts. This is referred to as lost motion because the motion is not used to perform its intended function. It is preferable in the design of automotive seat hinge assemblies to minimize lost motion in order that the actuating means have a solid feel to the user, and so that only a minimized amount of travel of the actuating parts are necessary to quickly perform their intended latching and unlatching functions. In the present invention, in order to minimize lost motion, the clearances between mating parts can be greatly reduced by moving one of the mating parts at either end of a gear train against the other moving parts, until there is little or no clearance remaining between remaining mating parts in the gear train.

With the vehicular seatback recliner hinge disclosed in applicants' U.S. Pat. No. 5,205,609, issued Apr. 27, 1993, which is incorporated herein by reference, it has been found that, from one mass-produced recliner hinge to the next, constructed as taught thereby, an angular variation in position of the hand operated lever arm due to stacked tolerances as aforesaid in the order of 30°–40° is possible, once the entire recliner hinge has been assembled. Variation of this magnitude is unacceptably high.

In the prior art recliner hinge of U.S. Pat. No. 5,205,609, and in similar vehicle seat hinge assemblies, the locking pawl of the hinge assembly has a cam follower surface that follows a cam surface on the lever means. Where the cam follower surface contacts the cam surface, the cam surface is oriented such that a line perpendicular thereto passes very closely to the axis of rotation of the lever arm, which is typically referred to as a "small moment arm". Such arrangement is desirable for achieving proper engagement of the cam surface of the lever arm with the cam following surface, and for desirable force transmission characteristics between the cam surface and the cam following surface. Such arrangement does, however, further amplify the angular variation in the orientation of the hand operated lever arm, because of the small moment arm involved. A relatively small variation in the linear displacement, perhaps about 0.030", in the cam surface in a direction generally perpendicular thereto will cause a relatively large angular displacement of the lever arm, of perhaps 30° to 40° or even more. In a lever arm having a length of about 2" or 3", the end of the lever arm can resultingly vary in position by as much as 1" or 2". This degree of variation is also unacceptable for the reasons previously given.

Further, because of the large variations in angular displacement of the lever arm attributable to tolerance stacking as aforesaid, the cam follower surface must be designed to accommodate these variations. Thus, the locking pawl is, in such latching mechanisms, predictably unlocked only after about 9° of angular rotation of the cam surface with respect to the cam following surface. While this amount of travel is considered generally acceptable, it would be highly desirable to have the locking pawl unlocked after about 3° of angular rotation, thus increasing the precision and efficiency of the release mechanism. Such increase in precision and efficiency of the release mechanism not only provides for a more precise feel to the user of the mechanism, but allows for closer tolerances to be used in the design of the trim components of the seat assembly which surround and cooperate with the hand-operated lever arm.

SUMMARY OF THE INVENTION

It is therefore an object of the present invention to provide a release mechanism for vehicle seat hinge assemblies that allows a lever means of the mechanism to be oriented in a desired design orientation in each replication of the vehicle seat hinge assembly with an increased degree of precision.

It is another object of the present invention to provide a release mechanism for vehicle seat hinge assemblies that allows the lever means of the release mechanism to be oriented to an accuracy of within about 3° of motion in each replication of the vehicle seat hinge assembly.

It is a further object of the present invention to produce a rotationally adjustable backlash reduction means incorporated into the release mechanism of a vehicle seat hinge assembly that allows for displacement selective mounting of the lever means of the release mechanism in each replication of a vehicle seat hinge assembly and that thereby reduces the amount of backlash between the remaining components of the release mechanism.

It is yet another object of the present invention to provide a method of assembly of a release mechanism for vehicle seat hinge assemblies wherein the angular positioning of the lever means is selectively adjustable in each replication of the mechanism by way of rotation of an eccentrically operative rotatably adjustable backlash reduction means.

It is a further object of the present invention to provide a method of assembly of a release mechanism for a vehicle seat hinge assembly which provides for a reduction in the amount of backlash between the operative components of the release mechanism in each replication of the vehicle seat hinge assembly.

It is a further object of the present invention to provide a release mechanism for vehicle seat hinge assemblies that allows for design of the cam and cam following surfaces of the release mechanism to provide for faster and more positive unlatching than has been possible with prior art release mechanisms.

Other objects, features and characteristics of the present invention, as well as methods of operation and functions of the related elements of the structure, and the combination of parts and economies of manufacture, will become more apparent upon consideration of the detailed description which follows and of the appended claims with reference to the accompanying drawings, all of which form a part of this specification.

A backlash reduction mechanism, according to the present invention, for incorporation into a selectively latchable vehicle seat hinge assembly is disclosed. The seat assembly has "N" interconnecting movably operative latch members numbered "1" through "N", wherein "N" is a positive integer equal to or greater than 2. The latch members are positioned seriatim with respect to one another in order "1" through "N". The seat assembly also has a first hinge plate for operatively mounting said latch members thereon. The backlash reduction mechanism comprises an eccentrically operative rotatably adjustable backlash reduction means rotatably mounted on the first hinge plate about a first pivot axis for achieving selective adjustment of the relative positioning of one or more of the latch members to one another, wherein, during manufacture of said selectively latchable vehicle seat hinge assembly, the eccentrically operative rotatably adjustable backlash reduction means is rotated about the first pivot axis to an optimized position, thereby to interact with the latch member "1" such that the latch member "1" is moved generally toward the latch member "2", thereby to cause selective reduction in the amount of backlash between the latch member "1" and the latch member "2" and subsequently between other juxtaposed ones of the latch members.

A method of assembling a backlash reduction mechanism, according to the present invention, into a selectively latchable vehicle seat hinge assembly is also disclosed. The seat assembly has "N" latch members numbered "1" through "N", wherein "N" is a positive integer equal to or greater than 2, and a first hinge plate for mounting said latch members thereon. The method comprises the steps of:

placing the first hinge plate in a jig;

operatively positioning a common pivot pin on the first hinge plate;

mounting the eccentrically operative rotatably adjustable backlash reduction means on the first hinge plate in rotatable relation thereto;

operatively mounting the latch members "1" through "N" on the first hinge plate such that the latch members are positioned seriatim with respect to one another in order "1" through "N", so as to interconnect with one another and be movably operative with respect to one another;

rotationally adjusting the eccentrically operative rotatably adjustable backlash reduction means to an optimized position so as to frictionally interact with the latch member "1" such that the latch member "1" is moved generally toward the latch member "2", thereby to cause selective reduction in the amount of backlash between the latch member "1" and the latch member "2" and subsequently between other juxtaposed ones of the latch members; and, fastening the connecting members so as operatively secure the "N" latch members and fastening the eccentrically operative rotatably adjustable backlash reduction means to the first hinge plate such that the optimized position is retained.

DETAILED DESCRIPTION OF A PREFERRED EMBODIMENT

Introduction to the Drawings FIG. 1 is a perspective view of a vehicle seat having a seat hinge assembly mounted thereon with the backlash reduction mechanism of the present invention mounted in combination therewith;

Figure 5:
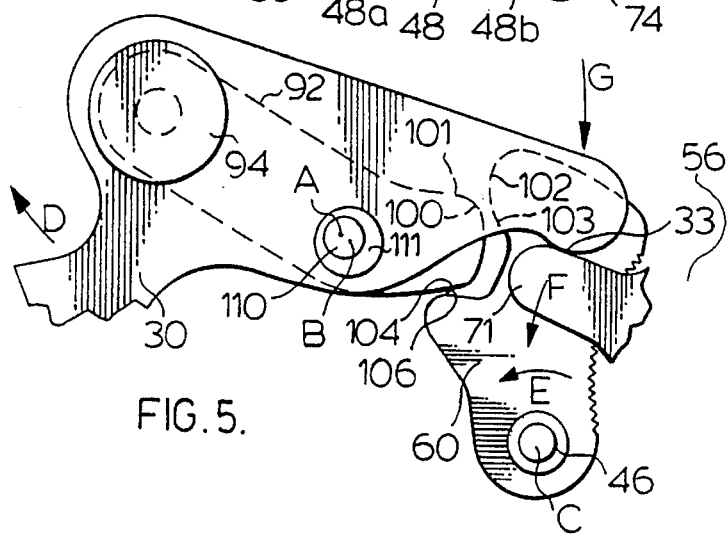
FIG. 5 is an enlarged partially cut away view of the release mechanism of FIG. 4, shown in its unlatched position.
Figure 6:
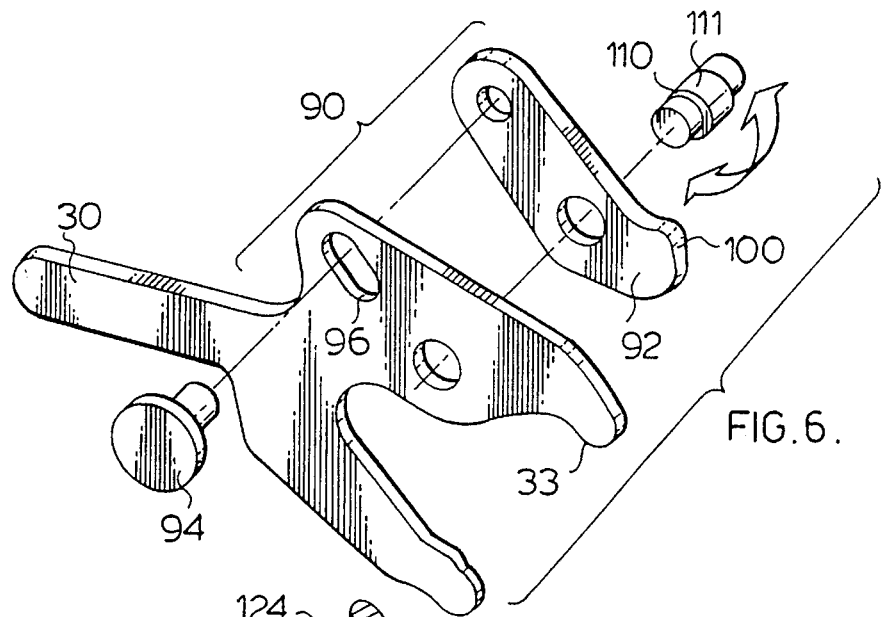
Figure 7:
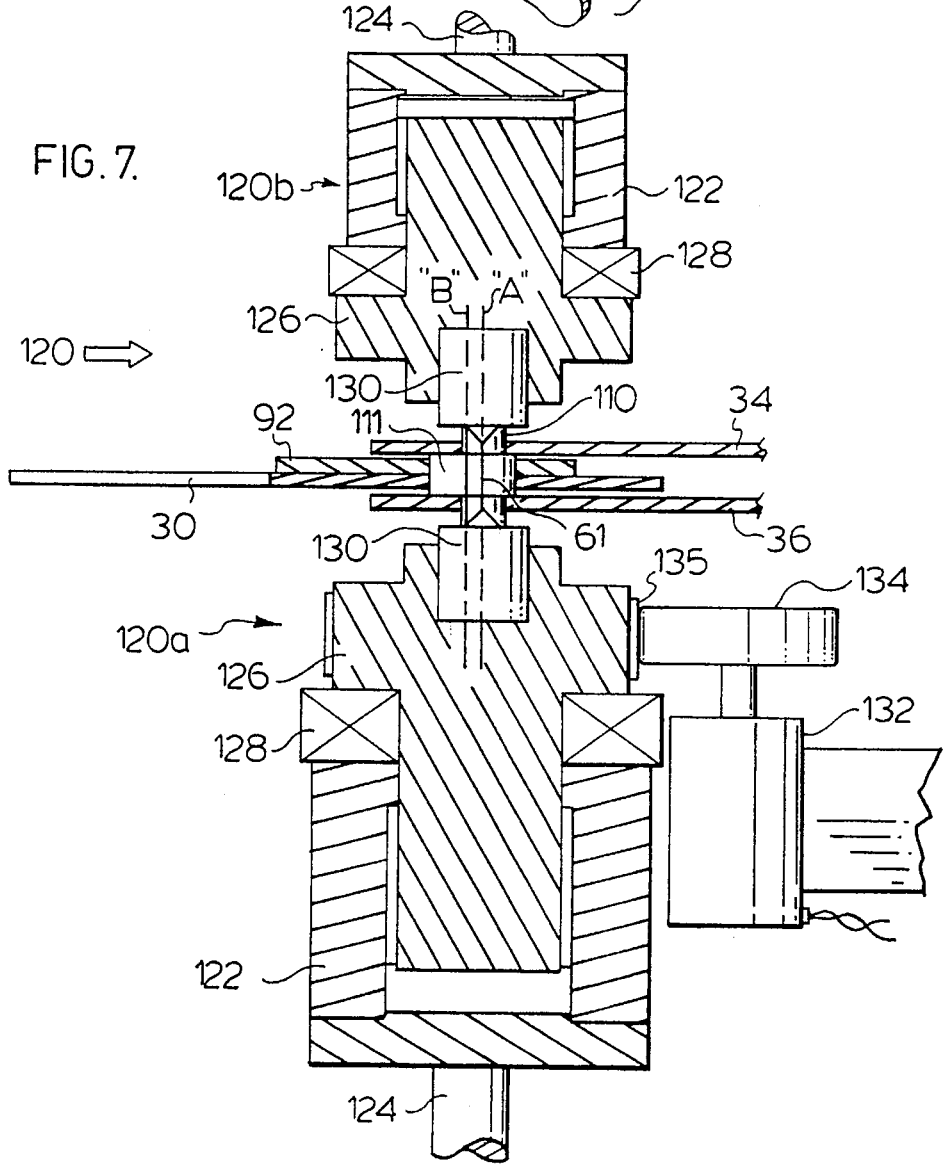

FIG. 6 is an exploded perspective view of a portion of the backlash reduction mechanism shown in FIG. 5; and FIG. 7 is a side elevational view, partially in section, of the vehicle seat hinge assembly and the backlash reduction mechanism of the present invention in combination therewith, both positioned within a jig mechanism adapted to rotationally adjust a portion of the release mechanism to an optimized position during assembly.

Figure 1:
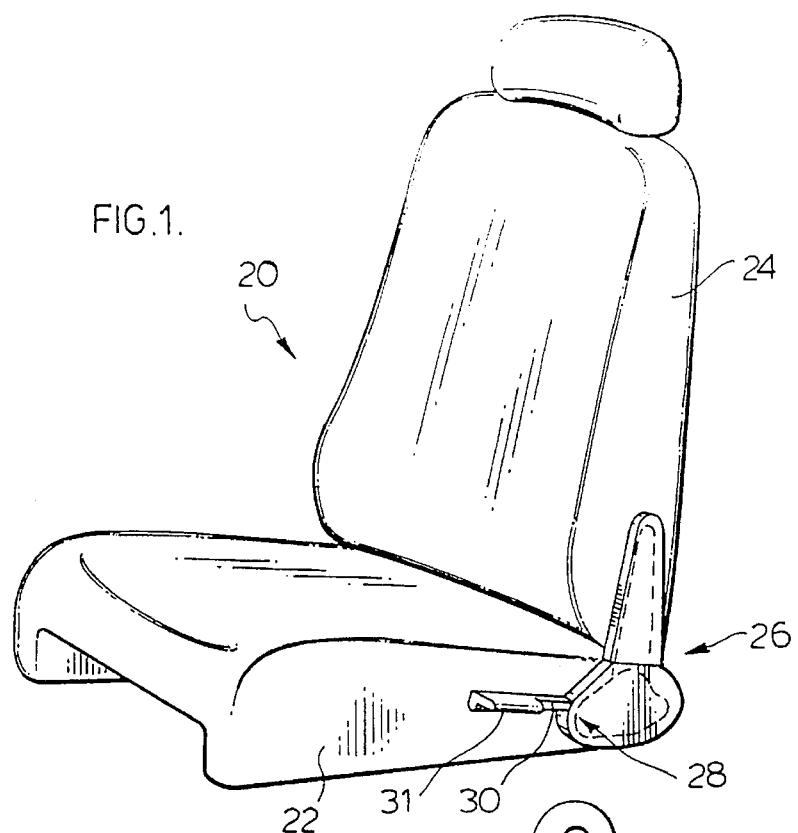

FIG. 1 shows a vehicle seat 20 essentially comprising a seat cushion 22 and a seatback 24 with a selectively latchable vehicle hinge latch assembly, designated by the general reference numeral 26, connecting the seat cushion 22 and the seatback 24 in foldable relation to one another. The backlash reduction mechanism of the present invention, generally designated by the reference numeral 28, is installed in combination with the selectively latchable vehicle seat hinge assembly 26. A manually operable lever means 30 is part of a cam assembly 90, which is itself part of both the selectively latchable vehicle seat hinge assembly 26 and the backlash reduction mechanism 28 and is used to selectively release and engage the vehicle seat hinge assembly 26. The manually operable lever means 30 extends forwardly from the area of the vehicle seat hinge assembly 26 and terminates in a grasping portion 31 (see FIG. 1). Further, with reference to the remaining Figures, the manually operable lever means 30 has a rearwardly positioned contacting surface 33, the function of which will be described subsequently. The manually operable lever means 30 allows for selectable releasing and engaging by an operator of the selectively latchable vehicle seat hinge assembly 26 and incorporates the backlash reduction mechanism 28. A conventional vehicle seat hinge assembly (not shown) is similarly positioned on the opposite other lateral side of the vehicle seat 20 for coordinated pivotal folding of the seatback 24, but its construction, placement and manner of operation are well-known to those skilled in the art, so that a further description thereof is not necessary to a full understanding of the present invention.

Reference will now be made to FIGS. 2 through 6, which show in considerably greater detail the selectively latchable vehicle seat hinge assembly 26 and the backlash reduction mechanism 28 of the present invention mounted in combination therewith. In the preferred embodiment illustrated, the five main latch members described below are referred to as latch member "1" through latch member "5". The latch members are positioned seriatim with respect to one another in the order: latch member "1"; latch member "2"; latch member "3"; latch member "4"; latch member "5". Latch member "5" is a hinge arm 32, having a gear rack 52 positioned along its lower edge. Latch member "4" is a pinion gear 54 adapted to mesh with the gear rack 52. Latch member "3" is a ratchet wheel 56 securely attached to the pinion gear 54. Latch member "2" is a latch pawl means 60 that has a series of teeth 64 thereon that selectively engage and disengage with the ratchet wheel 56. Latch member "1" is a cam assembly 90 that engages the latch pawl means 60. In the preferred embodiment illustrated, the cam assembly 90 has a cam surface 100 that is adapted to engage a cam following surface 102 on the latch pawl means 60.

The vehicle seat hinge assembly 26 is of known design and has a first hinge plate 34 and a second hinge plate 36 for mounting the latch members "1" through "5" thereon in movably operative relation thereto in interposed relation to said first 34 and second 36 hinge plates. The first 34 and second 36 hinge plates are rigidly affixed to each other in generally parallel relation by known fasteners such as first 44, second 45 and third 46 rivetable pins. These pins 44, 45, 46 are fastened in place by any well known method, such as orbital staking or ring staking. Additionally, spacers 43 keep the first 34 and second 36 hinge plates spaced apart at a set distance. The hinge arm 32 is rigidly attached to the seatback 24 and the first 34 and the second 36 hinge plates are rigidly attached to the seat cushion 22 by any conventional fastening means acting through bolt holes 37,37 and through the central apertures of the spacers 43,43.

The hinge arm 32 is mutually rotatable with respect to the first hinge plate 34 and a second hinge plate 36, all three of which are mounted about a common pivot pin 40, which is typically fastened to the first 34 and second 36 hinge plates to resist rotation, by any well known method such as orbital staking or ring staking. A return spring 38 engages a central slot 41 in the pivot pin 40 and interfaces with the hinge arm 32 by way of a pin 42, to thereby bias the hinge arm 32 with respect to the first hinge plate 34 and second hinge plate 36, and thus assist with forward pivotal movement of the seatback 24 when the vehicle seat hinge assembly 26 releases the seatback 24.

The hinge arm 32 has an aperture 50 that receives the common pivot pin 40 and allows the hinge arm 32 to rotate thereabout. The gear rack 52 is located at the lower end of the hinge arm 32 and is adapted to engage with the pinion gear 54. Engagement of the pinion gear 54 with the gear rack 52 on the hinge arm 32 precludes the hinge arm 32 from rotating when the selectively latchable vehicle seat hinge assembly 26 is in its latched configuration. The pinion gear 54 is press-fit into a co-operating opening in the ratchet wheel 56, and is concentrically mounted therein for mutually dependent rotation with respect to the first 34 and second 36 hinge plates.

The pinion gear 54 has an integral axle shaft 55 that extends outwardly therefrom in two opposed directions with one end 55b of the axle shaft 55 being received in journalled relation in a first aperture 65 of a first bushing 66 and the other end 55a (not visible) of the axle shaft 55 being received in journalled relation in a second aperture 63 of a second bushing 68. The first 66 and second 68 bushings have first 67 and second 69 hub portions respectively, with the first 67 and second 69 hub portions being formed as bosses in the respective bushings 66, 68 by, for example, a semi-piercing press operation. The first 66 and second 68 bushings are themselves respectively mounted in a first opening 70 and a second opening 72 in the first 34 and second 36 hinge plates, by way of the first 67 and second 69 hub portions, for mutually rotatable rotation therein. In this manner, the ratchet wheel 56 and the pinion gear 54 are concentrically mounted for mutually dependent rotation with respect to the first 34 and second 36 hinge plates.

The first bushing 66 has a trip arm 71 extending therefrom generally in the direction of the manually operable lever means 30. The first bushing 66 and the manually operable lever means 30 are laterally aligned between the first 34 and second 36 hinge plates such that the contact surface 33 on the manually operable lever means 30 physically interacts with the trip arm 71.

A pin 74 is inserted into first 76 and second 78 openings in the first 66 and second 68 bushings, respectively, thus keeping the first 66 and second 68 bushings rotationally aligned with one another.

Figure 3:
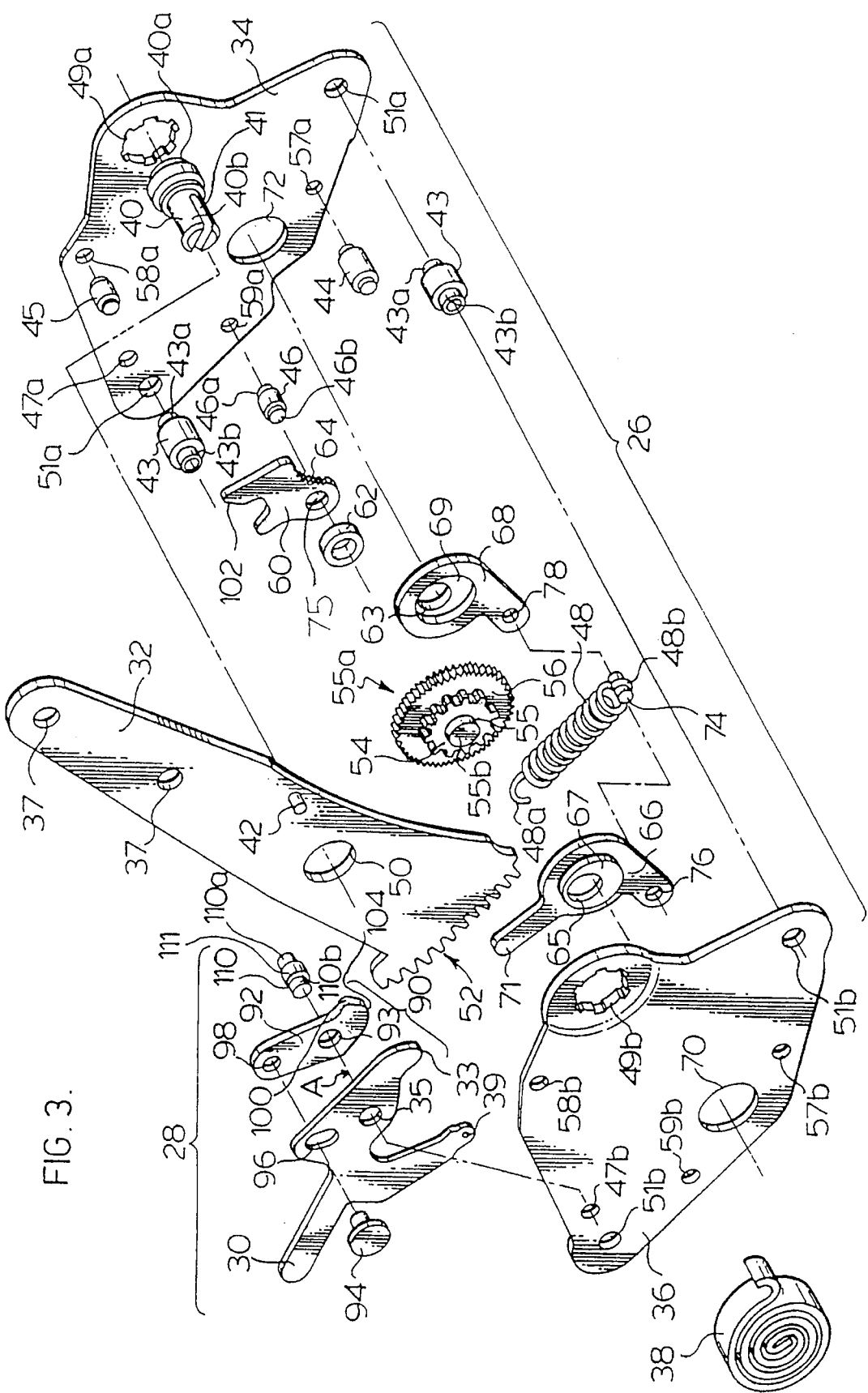
FIG. 3 is an exploded isometric view of a vehicle seat hinge assembly and the backlash reduction mechanism of the present invention in combination therewith.

In use, when the seat hinge assembly 26 is unlatched by rotation of the lever means 30 in the clockwise direction of FIG. 3, the contact surface 33 contacts the trip arm 71 on the first bushing 66. This motion causes uniform rotation of the bushings 66 and 68 in a counter-clockwise direction, which, due to the eccentric location of the apertures 65 and 63, causes the pinion gear 54 to be moved slightly away from the gear rack 52 on the hinge arm 32. This increases backlash upon unlatching of the seat hinge assembly 26, thus easing the unlatching performance of the selectivity latchable seat hinge assembly 26. Conversely, returning the manually operable lever means 30 to the latched position shown in FIG. 4, causes the pinion gear 54 to move into closer meshing interaction with one another, thus reducing backlash in the latched mechanism. While this feature is not a direct part of the present invention, it is preferably included in the vehicle seat hinge assembly in conjunction with the backlash reduction mechanism 28 of the present invention described below. Thus, the eccentric mechanism just described constitutes a separate invention which is fully described in applicants' U.S. patent application Ser. No. 650,827, now U.S. patent application Ser. No. 5,205,609 issued Apr. 27, 1993.

The backlash reduction mechanism 28 of the present invention includes the cam assembly 90 and the eccentrically operative rotatably adjustable backlash reduction means 110. As previously described, the latch pawl means 60 has a cam following surface 102 on a portion of one edge thereof, and a series of teeth 64 on a generally oppositely facing edge. The teeth 64 are adapted for latching engagement with the teeth of the ratchet wheel 56. The latch pawl means 60 is pivotally mounted on the first 34 and second 36 hinge plates by way of a pivot pin 46 for selective rotational movement about a third pivot axis "C" between a latched position whereat the latch pawl means 60 engages with the ratchet wheel 56 (see FIG. 4) and an unlatched position (not shown) whereat the latch pawl means 60 disengages from the ratchet wheel 56. A spacer 62 displaces the latch pawl means 60 towards the second hinge plate 36, so that the teeth 64 of the latch pawl means 60 can meshingly align with the teeth of the ratchet wheel 56.

The cam assembly 90 includes the manually operable lever means 30 and an extension arm 92 that is securely fastened to the manually operable lever means 30 by way of a rivetable fastener 94. The fastener 94 acts through openings 96 and 98 in the manually operable lever means 30 and the extension arm 92 respectively. The opening 96 is oblong so as to accommodate the fastener 94 at a plurality of locations therein, thereby allowing the lever means 30 and the extension arm 92 to be affixed to one another at a plurality of angular orientations. The extension arm 92 of the cam assembly 90 has a cam surface 100 that is adapted to engage the cam following surface 102 on the latch pawl means 60.

Figure 2:
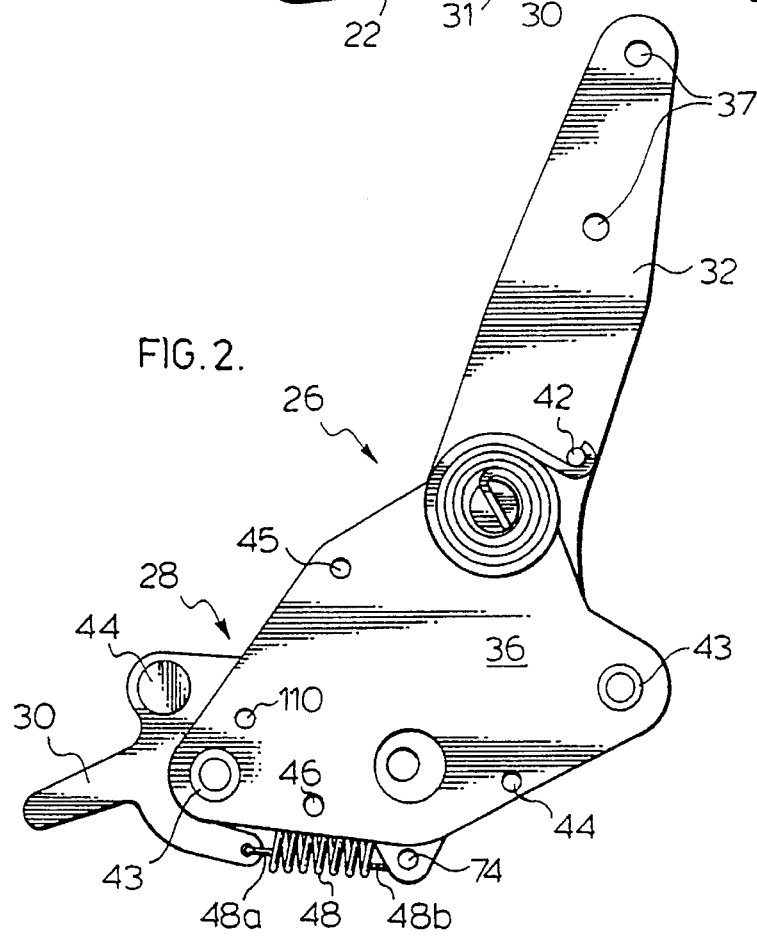
FIG. 2 is a side elevational view of a vehicle seat hinge assembly having the backlash reduction mechanism of the present invention mounted in conjunction therewith.
Figure 4:
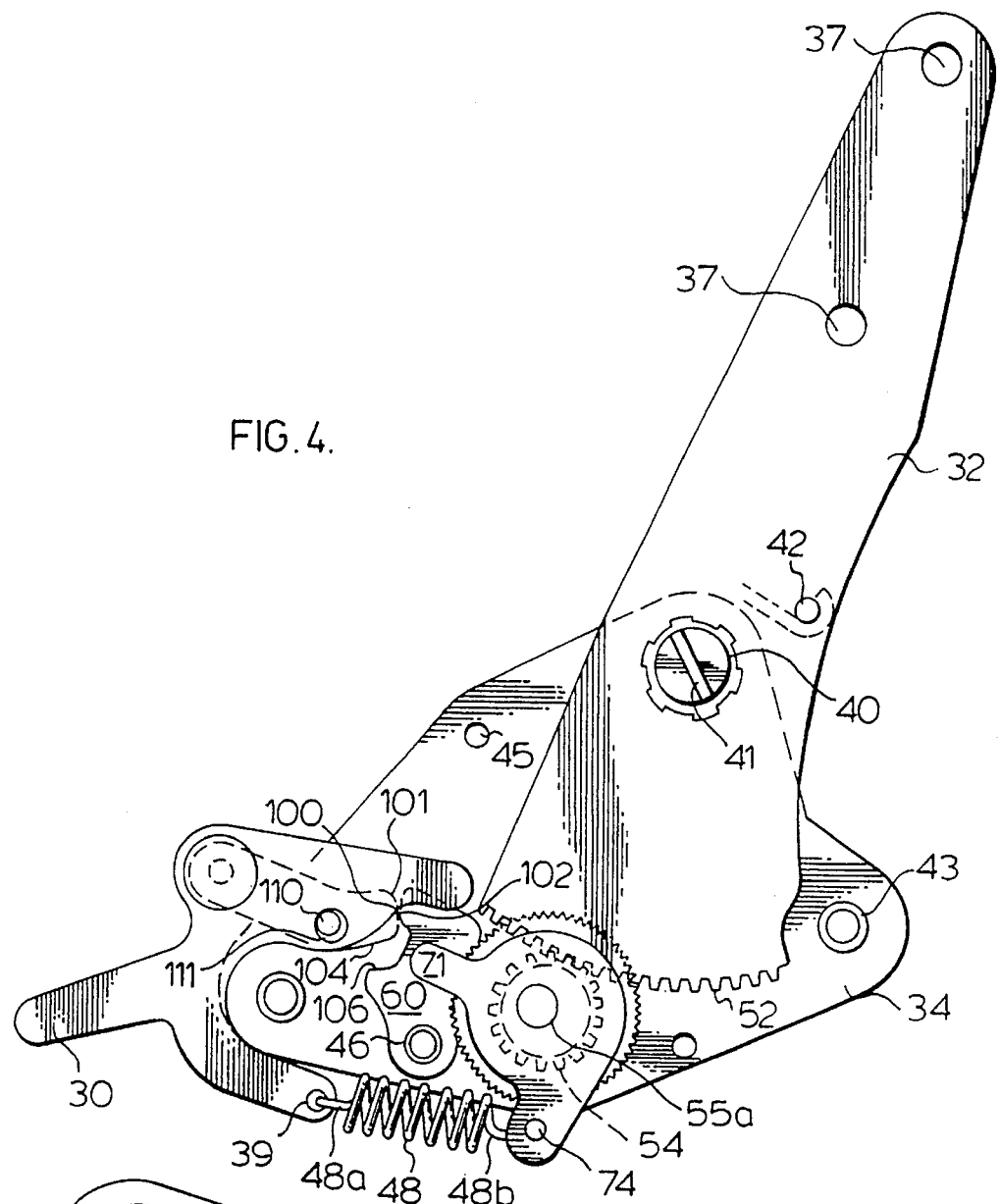
FIG. 4 is a side view of a vehicle seat hinge assembly with parts omitted for clarity, with the backlash reduction mechanism of the present invention mounted in combination therewith, shown in its latched position.

The cam assembly 90 is mounted on the first 34 and second 36 hinge plates for cooperative rotational movement about the eccentrically operative rotatably adjustable backlash reduction means 110. A return spring 48 is attached at its first end 48a to the manually operable lever means 30 through an opening 39, and is attached at its second end 48b to the pin 74. The spring 48 biases the cam assembly 90 in a counter-clockwise direction, as shown in FIG. 2, to a latched rest position as shown in FIGS. 2 and 4, at which latched rest position the cam assembly 90 biases the latch pawl means 60 into engagement with the ratchet wheel 56.

The eccentrically operative rotatably adjustable backlash reduction means 110 is provided in order to achieve selective adjustment of the relative positioning of one or more of the latch members "1" through "5" in a manner which will now be described. In the preferred embodiment, the eccentrically operative rotatably adjustable backlash reduction means 110 is a pin that is rotatably mounted on the first 34 and second 36 hinge plates about a centrally located first pivot axis "A" (see especially FIG. 5). The central portion of the eccentrically operative rotatably adjustable backlash reduction means 110 is provided with an eccentrically displaced hub 111 that has a second pivot axis "B" that is centrally located therein and directed along the length thereof. The second pivot axis "B" of the hub 111 is generally parallel to the first pivot axis "A" and is offset therefrom in a direction substantially perpendicular thereto. The hub 111 is generally cylindrical in shape so that the manually operable lever means 30 and the extension arm 92 may pivot therearound about the second pivot axis "B".

The cam assembly 90 (comprising the manually operable lever means 30 and the extension arm 92) rotates around the eccentrically operative rotatably adjustable backlash reduction means 110 when the grasping portion 31 of the manually operable lever means 30 is lifted upwardly in the direction of arrow "D" (see FIG. 5). Such rotation of the cam assembly 90 causes operative interaction between the cam surface 100 and the cam following surface 102 on the latch pawl means 60 such that the cam surface 100 moves downwardly along the cam following surface 102, thereby to cause a corresponding adjustment in the operative interaction between the cam surface 100 and the cam following surface 102, and further to cause the selective rotational movement of the latch pawl means 60 in the direction of arrow "E" of FIG. 5.

When the top portion 101 of the cam surface 100 has cleared the bottom portion 103 of the cam following surface 102, the latch pawl means 60 is free to move outwardly in the direction of arrow "E" from the ratchet wheel 56, thereby causing unlatching of the latch pawl means 60 and the ratchet wheel 56. The bottom portion 104 of the cam surface 100 contacts a receiving surface 106 on the latch pawl means 60, and thereby causing the latch pawl means 60 to rotate such that the teeth 64 become displaced from the teeth of the ratchet wheel 56, thus ultimately releasing the seatback 24 for folding rotational movement.

Once the top portion 101 of the cam surface 100 has cleared the bottom portion 103 of the cam following surface 102, further rotation of the manually operable lever means 30, as indicated by arrow "G" of FIG. 5, causes the contact surface 33 of the lever means 30 to contact the trip arm 71 of the first bushing 66. Continued rotation of the manually operable lever means 30 will cause corresponding rotation of the first bushing 66, in the direction of arrow "F" of FIG. 5, the effect of which has been described above.

It is one of the stated objects of this invention to release the seatback 24 for rotational folding movement with a minimum of lost motion of the manually operable lever means 30. Such lost motion is a function of two predominant and cumulative factors. The first of these is the distance of travel of the bottom portion 104 of the cam surface 100 before it contacts the receiving surface 106 of the cam following surface 102. The second of these is the clearances between the various latch members "1" through "N". The two factors are inextricably connected, in that the geometry of the cam follower surface 102, most notably the distance between the cam follower surfaces 102 and 106 (which interact with the respective cam surfaces 100 and 104), is critically limited by the manufacturing tolerances of the latch members, if predictable latching and unlatching performance of replications of the vehicle seat hinge assembly 26 is to be routinely obtained. In other words, while it is highly desirable to achieve fast latching and unlatching performance of the manually operable lever means 30 by reducing the distance between the two cam follower surfaces 102 and 106 of the latch pawl 60, this can only be reliably and operably achieved when the clearances between the latch members "1" through "N" (which are limited by the particular manufacturing processes utilized) are reduced a corresponding amount. Where the manufacturing tolerances have already been reached with respect to the production processes utilized in the manufacture of a particular type of vehicle seat hinge assembly, new ways of reducing the de facto backlash in the operative device must be devised. Such reduction in backlash is achieved in the present invention by translating the latch members "1" through "N" into intimately contacting relation to one another during assembly, such that there is less backlash between juxtaposed ones of the latch members "1" through "N" than is otherwise provided for according to standard manufacturing tolerances. The reduction of backlash in this manner allows the cam following surface 102 of the latch pawl 60 to be designed with the surfaces 102 and 106 closer together. Accordingly, significant reduction in the lost motion of the manually operative lever means 30 is achieved in a latching device according to the present invention through the reduction of backlash between latch members "1" through "N" of the vehicle seat hinge assembly 26 and through a thereby permitted re-design of the cam surface 100 and cam follower surface 102 with which cam surface 100 interacts.

The reduction of lost motion of the manually operable lever means 30 is accomplished through ensuring placement of the cam surface 100 on the manually operable lever means 30 into tight, operative contact with the cam following surface 102 during assembly. It has been found that adjustably abutting the cam surface 100 against the cam following surface 102 with a predetermined threshold force during assembly of the vehicle seat hinge assembly 26 results in reductions in backlash throughout the assembly 26, by taking up any initial clearances between the latch members "1" through "N", thereby providing for accurately predictable and replicatable movement of the cam surface 100 with respect to the cam following surface 102 and of the bottom portion 104 of the cam surface 100 with respect to the receiving surface 106 of the cam following surface 102. Such adjustable placement of the cam surface 100 is attained through optimized rotational adjustment of the eccentrically operative rotatably adjustable backlash reduction means 110. This optimized rotational adjustment is achieved during assembly of the hinge assembly 26 by rotating the eccentrically operative rotatably adjustable backlash reduction means 110 about its first pivot axis "A". When the eccentrically operative rotatably adjustable backlash reduction means 110 is rotated about its first pivot axis "A", the second pivot axis "B" (which is centrally located within the eccentric hub 111) is moved. Such movement causes the hub portion 111 to interact with the cam assembly 90, which is latch member "1", such that the extension arm 92 is axially moved generally toward the latch pawl means 60, which is latch member "2", thereby causing selective reduction in the amount of backlash between the lever means 30 and the latch pawl means 60, and subsequently between other juxtaposed ones of said latch members. In the preferred embodiment illustrated, the second pivot axis "B" of latch member "1" is moved relative to the third pivot axis "C".

Resulting from such optimized rotation of the eccentrically operative rotatably adjustable backlash reduction means 110, the cam surface 100 is abutted against the cam following surface 102 such that there is no lost motion in the travel of the extension arm 92 or the attached manually operable lever means 30. Correspondingly, the movement of the manually operable lever means 30 is accurately predictable and reproducible as is the angular orientation of the manually operable lever means 30 in its rest position, the latter to within about 1° from one replication of the vehicle seat hinge assembly 26 to another.

It may also be desirable to reduce the clearance between the contact surface 33 of the lever means 30 and the trip arm 71 of the first bushing 66. Such controlled reduction of the clearances between the lever means 30 and the trip arm 71 is possible because of the opening 96 that allows the lever means 30 and the extension arm 92 to be rotated about the eccentric hub 111 independently of one another upon rotation of the eccentrically operative rotatably adjustable backlash reduction means 110. When optimized clearances are obtained by reason of such rotation, the rivetable fastener 94 is fastened at the adjusted position acting through the opening 96, thereby to hold the cam assembly 90 together in the optimized adjusted configuration so obtained.

The method of assembling the backlash reduction mechanism 28 of the present invention for use in combination with the vehicle seat hinge assembly 26, preferably comprises the following steps.

The first hinge plate 34 is placed in a known assembly jig and securely retained therein such that the latch members "1" through "5" may be movably operatively mounted thereon and the eccentrically operative rotatably adjustable backlash reduction means 110 may be rotatably mounted thereon, thereby to be positioned seriatim with respect to one another in order "1" through "5", so as to interconnect with one another and be movably operative with respect to one another. The order of mounting the latch members "1" through "5" and the eccentrically operative rotatably adjustable backlash reduction means 110 is not critical, and may be prioritized as found necessary.

The preferred method of assembly is as follows. The common pivot pin 40 is operatively positioned on the first hinge plate 34 so as to preclude rotational movement on the first hinge plate 34 by way of a short central shaft portion 40*a*, which is received in an aperture 49*a*. The aperture 49*a* is stepped around its perimeter so as to help preclude rotation of the common pivot pin 40 therein after pin staking of the pivot pin as, for example, taught in U.S. Pat. No. 5,340,195 issued Aug. 23, 1994, which application is incorporated herein by reference. A plurality of connecting members, including the first 44, second 45 and third 46 pivot pins and the two spacers 43 are then operatively positioned on the first hinge plate 34. The first 44 and second 45 pivot pins are positioned on the first hinge plate 34 and are received by the apertures 57*a* and 58*a* respectively. The two spacers 43 are positioned on the first hinge plate 34 and the central shaft portions 43*a* are received in the two apertures 51*a* respectively. The hinge arm 32 is pivotally mounted about the common pivot pin 40, with an elongated central shaft portion 40*b* received in the aperture 50 in the hinge arm 32. The pinion gear 54 and the ratchet wheel 56 are then rotatably mounted on the second bushing 68 by way of the end 55*a* of the axle shaft 55, which end 55*a* is received in the aperture 63 in the second hub portion 69 of the second bushing 68. The first bushing 66 is then rotatably mounted on the end 55*b* of the axle shaft 55, which end 55*b* is received in the aperture 65 in the first hub portion 67 of the first bushing 66 so as to form a sub-assembly. The first 66 and second 68 bushings are then aligned with one another by way of a pin 74 that is inserted into first 76 and second 78 openings in the first 66 and second 68 bushings respectively.

The sub-assembly is then mounted on the first hinge plate 34 by way of the second hub portion 69, which is received in second opening 72 in the first hinge plate 34 such that the pinion gear 54 is meshingly aligned with the teeth of the gear rack 52 on the hinge arm 32.

The latch pawl means 60 is then pivotally mounted with respect to the first hinge plate 34 by way of pivot pin 46, which is mounted by way of a central shaft portion 46a in an aperture 59a. An aperture 75 in the latch pawl means 60 receives the pivot pin 46, thereby permitting selective rotational movement of the latch pawl means 60 about the third pivot axis "C" between a latched position whereat the latch pawl means 60 engages with the ratchet wheel 56, and an unlatched position whereat the latch pawl means 60 disengages from the ratchet wheel 56. The latch pawl means 60 is preferably initially positioned in the latched position as shown in FIGS. 4 and 5, at which position the teeth 64 of the latch pawl means 60 engage the teeth of the ratchet wheel 56. The spacer 62 is then positioned on the third pivot pin 46 against the latch pawl means 60.

Such positioning should then be verified visually or by well known pattern matching electronic position verification means through an appropriate viewing port (not shown) so as to ensure that the teeth 64 on the latch pawl means 60 are meshingly aligned with the teeth on the ratchet wheel 56.

The eccentrically operative rotatably adjustable backlash reduction means 110 is mounted on the first hinge plate 34 in rotatable relation thereto by way of central shaft portion 110a, which is received in a circular aperture 47a in rotatable relation thereto. A tool pin (not shown) is preferably inserted through an appropriate port (not shown) in the first hinge plate 34 so as to define a temporary limit position for the cam assembly 90. The cam assembly 90, which includes the manually operable lever means 30 and the extension arm 92, is then pivotally mounted on the eccentrically operative rotatably adjustable backlash reduction means 110, such that an aperture 35 in the manually operable lever means 30 and an aperture 93 in the extension arm 92 receive the eccentrically operative rotatably adjustable backlash reduction means 110, for pivotal movement about the second pivot axis "B". Further, the cam surface 100 on the cam assembly 90 is juxtaposed the cam following surface 102 on the latch pawl means 60. Such juxtapositioning should then be verified visually or by well known pattern matching electronic position verification means through an appropriate viewing port (not shown) so as to ensure that the cam surface 100 and the cam assembly 90 are juxtaposed one another. Such pivotal mounting of the eccentrically operative rotatably adjustable backlash reduction means 110 permits selective translation of the second pivot axis "B", upon rotation of the eccentrically operative rotatably adjustable backlash reduction means 110, as will be described subsequently.

A rivetable fastener 94 is placed through the openings 96 and 98 in the manually operable lever means 30 and the extension arm 92 respectively.

The second hinge plate 36 is then positioned in place in the assembly jig, such that the respective ends of various components are received in the respective apertures or openings in the second hinge plate 36 as described above. More specifically, the eccentrically operative rotatably adjustable backlash reduction means 110 is rotatably mounted thereon by way of its central shaft portion 110b, which shaft portion is received in a circular aperture 47b in rotatable relation thereto. The elongated central shaft portion 40b of the common pivot pin 40 is received in aperture 49b. The first hub portion 67 of the first bushing 66 is received in first opening 70. The central shaft portions 44b, 45b and 46b of the respective first 44, second 45 and third 46 rivetable pins are received in the apertures 57b, 58b and 59b respectively. The central shaft portions 43b of each of the two spacers 43 are received in the two apertures 51b respectively. In this manner, the latch members "1" through "5" are operatively mounted in interposed relation between the first 34 and second 36 hinge plates.

Once the vehicle seat hinge assembly 26, including the backlash reduction mechanism 28, has been loosely assembled as described above, it is placed into a rotating die mechanism designated by the general reference numeral 120, which die mechanism comprises two similar halves 120a and 120b, as shown in FIG. 7. Each half of the rotating die mechanism 120 comprises an outer die housing 122 that is rigidly attached to a press shaft 124, which is operatively connected to a hydraulic press, and a rotatable inner die member 126. Each rotatable inner die member 126 is rotatably mounted with respect to the outer die housing 122 by a bearing 128 that is operatively attached to the outer die housing 122. Removably seated in each rotatable inner die member 126 is a spindle 130, which rotates with its respective rotatable inner die member 126.

The vehicle seat hinge assembly 26 with the backlash reduction mechanism 28 incorporated therein, is held between the two halves 120a and 120b of the rotating die mechanism 120, with the eccentrically operative rotatably adjustable backlash reduction means 110 being retained in reasonably tight relation between the two opposed spindles 130. The lower rotatable inner die member 126 is selectively driven by an electric motor 132 by way of a frictionally engaging flywheel 134, which flywheel engages a frictional enhancement surface 135 positioned around the outer circumference of inner die member 126.

The connecting members are then fastened to the first 34 and second 36 hinge plates such that the first 34 and second 36 hinge plates are rigidly connected to each other in generally parallel relation. The common pivot pin 40, and all of the connecting members such as the first 44, second 45, and third 46 pins, and the spacers 43, are securely fastened in place, preferably simultaneously by any well known rivetting method such as orbital staking or ring staking, using well known hydraulic press techniques, so as to rigidly connect the first 34 and second 36 hinge plates to each other in generally parallel relation.

The eccentrically operative rotatably adjustable backlash reduction means 110 is rotationally adjusted to an optimized position by rotation of the rotatable inner die member 126 and the spindles 130. As the eccentrically operative rotatably adjustable backlash reduction means 110 is rotated about its first pivot axis "A" the second pivot axis "B" is moved in a direction substantially perpendicular to the second pivot axis "B", as the hub 111 is eccentrically located on the eccentrically operative rotatably adjustable backlash reduction means 110. This correspondingly moves the manually operable cam assembly 90, which is latch member "1" in the same direction, such that the manually operable lever means 30 is moved generally toward the latch pawl means 60, which is latch member "2", thereby to cause selective reduction in the amount of backlash between the latch member "1" and the latch member "2" and subsequently between other juxtaposed ones of the latch members. The optimized position is realized when the second pivot axis "B" has been translated to a position such that the extension arm 92 exerts a pre-determined threshold force against the latch pawl means 60. This pre-determined force depends on several factors and may be determined through routine calculation and experimentation. This force against the latch pawl means 60 causes a corresponding tightening adjustment in the operative interaction between the cam surface 100 and the cam following surface 102, thereby to cause reduction in the amount of backlash between the latch pawl means 60 and the ratchet wheel 56, and between the pinion gear 54 and the gear rack 53 on the hinge arm 32.

The step of optimally rotationally adjusting the eccentrically operative rotationally adjustable backlash reduction means 110 comprises rotationally adjusting the eccentrically operative rotatably adjustable backlash reduction means 110 until a pre-designated torque value is reached. The preferred designated torque valve is about 10 ft. lbs.

The eccentrically operative rotatably adjustable backlash reduction means 110 is also fastened by known rivetting techniques to the first 34 and second 36 hinge plates after rotation as aforesaid by the hydraulic press (not shown) acting through shafts 124, 124, such that the optimized position achieved by the rotation is retained.

Preferably, the final securing operation is the secure fastening of the extension arm 92 to the manually operable lever means 30 by way of rivetable fastener 94 in rigid relation thereto, so as to retain said manually operable lever means and said extension arm in fixed angular relation to each other such that pivoting the manually operable lever means 30 with respect to the first 34 and second 36 hinge plates causes corresponding pivoting of the extension arm 92. The extension arm 92 thereby becomes a rigid part of the cam assembly 90 and has a cam surface 100 thereon that is positioned to engage the cam following surface 102 on the latch pawl means 60. Further, the contact surface 33 is placed in contact with, or is positioned to be juxtaposed to, the trip arm 71 of the first bushing 66.

The biasing spring means 48 is then mounted between the cam assembly 90 and the first 34 and second 36 hinge plates with the first end 48a of the spring 48 hooking through an opening 39 in the manually operable lever means 30 of the cam assembly 90 and the second end 48b of the spring 48 being received by the pin 74 that is mounted between the first 66 and second 68 bushings. The biasing spring means 48 biases the cam assembly 90, such that the cam surface 100 on the extension arm 92 substantially engages the cam following surface 102 on the latch pawl means 60 and also such that the latch pawl means 60 is biased to the latched position where it engages with the ratchet wheel 56.

The return spring 38 is then mounted between the pin 42 on the hinge arm 32 and the common pivot pin 40, which is fastened to the first 34 and second 36 hinge plates.

The tool pin (not shown) is then removed from the port in the first hinge plate 34.

Other embodiments of the present invention also fall within the scope and spirit of the claims presented herein. In one such alternative embodiment (not illustrated), it is contemplated that the latch member "1" is rotatably mounted on the first and second hinge plates about a fourth pivot axis that is the pivot axis of a mount means that is separate from the eccentrically operative rotatably adjustable backlash reduction means. In this alternate embodiment, the eccentrically operative rotatably adjustable backlash reduction means is external to the latch member "1" and preferably comes into frictional contact with a portion of the surface of the latch member "1". When the eccentrically operative rotatably adjustable backlash reduction means is rotated it interacts with the latch member "1" such that the position of the latch member "1" is moved rotatably about the fourth pivot axis, thereby moving the latch member "1" relative to the latch member "2".

In another alternative embodiment (not illustrated), it is contemplated that the latch member "1" is slidably mounted on the first and second hinge plates, and that the position of the latch member "1" is movable relative to the position of the latch member "2" upon rotational adjustment of the eccentrically operative rotatably adjustable backlash reduction means.

In still another such alternative embodiment of the present invention (not illustrated), the cam surface is on the manually operable lever means and the extension arm from the manually operable lever means interacts with the trip arm on the first bushing.

In yet another alternative embodiment (not illustrated), the eccentrically operative rotatably adjustable backlash reduction means comprises a pair of opposed annular bushings retained in respective circular apertures in the opposed hinge plates, and a shaft connecting the bushings, with the shaft being eccentrically displaced with respect to the common centre axis of the bushings. Latch member "1" is mounted on the shaft and rotates about the eccentric axis of the shaft. When the bushings are rotated about their common centre axis, the shaft and the latch member "1" are moved with respect to the latch member "2", thereby to provide for backlash adjustment between the latch members "1" and "2" and between subsequent ones of said latch members.

We claim:

1. A method of assembling a backlash reduction mechanism in a selectively latchable vehicle seat hinge assembly having "N" latch members numbered "1" through "N", wherein "N" is a positive integer equal to or greater than 2, and a first hinge plate for mounting said latch members thereon, said method comprising the steps of:

placing said first hinge plate in a jig;

operatively positioning a common pivot pin on said first hinge plate;

mounting an eccentrically operative rotatably adjustable backlash reduction means on said first hinge plate in rotatable relation thereto;

operatively mounting said latch members "1" through "N" on said first hinge plate such that said latch members are positioned seriatim with respect to one another in order "1" through "N", so as to interconnect with one another and be movably operative with respect to one another;

rotationally adjusting said eccentrically operative rotatably adjustable backlash reduction means to an optimized position so as to frictionally interact with said latch member "1" such that said latch member "1" is moved generally toward the latch member "2" thereby to cause selective reduction in the amount of backlash between said latch member "1" and said latch member "2" and subsequently between other juxtaposed ones of said latch members; and, fastening a plurality of connecting members so as operatively secure said "N" latch members and fastening said eccentrically operative rotatably adjustable backlash reduction means to said first hinge plate such that said optimized position is retained.

2. A method of assembling a backlash reduction mechanism in a selectively latchable vehicle seat hinge assembly having "N" latch members numbered "1" through "N", wherein "N" is a positive integer equal to or greater than 2, and first and second hinge plates for mounting said latch members thereon, said first and second hinge plates being adapted for the mounting of said latch members thereon in interposed relation therebetween, said method comprising the steps of:

placing said first hinge plate in a jig;

operatively positioning connecting members and a common pivot pin on said first hinge plate;

mounting an eccentrically operative rotatably adjustable backlash reduction means on said first hinge plate in rotatable relation thereto;

operatively mounting said latch members "1" through "N" on said first hinge plate such that said latch members are positioned seriatim with respect to one another in order "1" through "N", so as to interconnect with one another and be movably operative with respect to one another;

positioning said second hinge plate in place on said jig such that said eccentrically operative rotatably adjustable backlash reduction means is rotatably mounted thereon and said latch members are operatively mounted thereon, with said eccentrically operative rotatably adjustable backlash reduction means, said latch members and said connecting members being in interposed relation between said first and second hinge plates;

rotationally adjusting said eccentrically operative rotatably adjustable backlash reduction means to an optimized position so as to frictionally interact with said latch member "1" such that said latch member "1" is moved generally toward the latch member "2", thereby to cause selective reduction in the amount of backlash between said latch member "1" and said latch member "2" and subsequently between other juxtaposed ones of said latch members;

fastening a plurality of connecting members to said first and second hinge plates such that said first and second hinge plates are rigidly connected to each other in generally parallel relation and so as to operatively secure said "N" latch members to said first hinge plate; and fastening said eccentrically operative rotatably adjustable backlash reduction means to said first and second hinge plates such that said optimized position is retained.

3. The method of claim 2, wherein said connecting members and said eccentrically operative rotatably adjustable backlash reduction means are fastened concurrently.

4. The method of claim 3, wherein said connecting members are rivet pins.

5. The method of claim 4, wherein said connecting members and said eccentrically operative rotatably adjustable backlash reduction means are fastened by stamping.

6. The method of claim 5, wherein "N" is a positive integer equal to "5", and wherein said latch members include, in seriatim, a hinge arm having a gear rack thereon with said hinge arm being referred to as latch member "5" and further being rotatable about a pivot pin mounted on said first and second hinge plates; a pinion gear adapted to mesh with said gear rack with said pinion gear being referred to as latch member "4"; a ratchet wheel securely attached to said pinion gear with said ratchet wheel being referred to as latch member "3", said pinion gear and said ratchet wheel being concentrically mounted for mutually dependent rotation with respect to said first and second hinge plates; a latch pawl means rotatably mounted on said first and second hinge plates for selective rotational movement between a latched position whereat said latch pawl means engages with said ratchet wheel and an unlatched position whereat said latch pawl means disengages from said ratchet wheel, said latch pawl means having a cam following surface thereon, with said latch pawl means being referred to as latch member "2"; and a cam assembly having a cam surface thereon that is adapted to engage said cam following surface on said latch pawl means, with said cam assembly being referred to as latch member "1"; wherein rotational movement of said cam assembly about said second pivot axis causes operative interaction between said cam surface and said cam following surface, thereby to cause said selective rotational movement of said latch pawl means.

7. The method of claim 6, wherein said cam assembly includes a manually operable lever means.

8. The method of claim 7, wherein the cam assembly is spring biased so as to cause operative interaction of said cam surface with said cam following surface, thereby to cause said latch pawl means to be biased to said latched position.

9. The method of claim 8, wherein said step of rotationally adjusting said eccentrically operative rotatably adjustable backlash reduction means to an optimized position comprises rotationally adjusting a mount means until a pre-designated torque value is reached.

10. The method of claim 9, wherein said pre-designated torque value is about 10 ft.lbs.

11. The method of claim 10, further comprising the step of:

securely fastening an extension arm to said manually operable lever means in rigid relation thereto, such that rotating said manually operable lever means with respect to said first and second hinge plates causes corresponding rotation of said extension arm, said extension arm thereby becoming part of said cam assembly and having said cam surface thereon.

12. The method of claim 11, wherein said extension arm is attached to said manually operable lever means by a rivet.

13. A method of assembling a backlash reduction mechanism in a selectively latchable vehicle seat hinge assembly having "N" latch members numbered "1" through "N", wherein, "N" equals 5; wherein latch member "5" is a hinge arm having a gear rack positioned thereon; wherein latch member "4" is a pinion gear having an integral axle shaft and being adapted to mesh with said gear rack; wherein latch member "3" is a ratchet wheel having teeth thereon and being securely attached to said pinion gear; wherein latch member "2" is a latch pawl means having a series of teeth thereon selectively engagable and disengagable with said ratchet wheel; wherein latch member "1" is a cam assembly engaging said latch pawl means; and, wherein first and second hinge plates are provided for mounting said latch members thereon, said first and second hinge plates being adapted for said mounting of said latch members thereon in interposed relation therebetween, said method comprising said steps of:

(a) placing said first hinge plate in place in a jig;

(b) operatively positioning connecting members and a common pivot pin on said first hinge plate;

(c) pivotally mounting said hinge arm on said pivot pin;

(d) rotatably mounting said pinion gear and said ratchet wheel between a first and a second bushing such that one end of said integral axle shaft is received in a respective aperture in a first hub portion of said first bushing and the other end of said axle shaft is received in a respective aperture in a second hub portion of said second bushing, so as to thereby form a sub-assembly;

(e) mounting said sub-assembly on said first hinge plate such that said teeth on said pinion gear are meshingly aligned with the teeth of said gear rack of said hinge arm;

(f) mounting said latch pawl means on a selected one of said connecting members such that said teeth on said latch pawl means are meshingly aligned with said teeth on said ratchet wheel;

(g) verifying that said teeth on said latch pawl means are meshingly aligned with said teeth on said ratchet wheel;

(h) mounting an eccentrically operative rotatably adjustable backlash reduction means on said first hinge plate in rotatable relation thereto;

(i) inserting a tool pin through a port in said first hinge plate so as to define a temporary limit position for said cam assembly;

(j) mounting said cam assembly on said eccentrically operative rotatably adjustable backlash reduction means such that a cam surface on said cam assembly is juxtaposed a cam following surface on said latch pawl means;

(k) placing a rivetable fastener through openings in a manually operable lever means and a extension arm of said cam assembly;

(l) positioning said second hinge plate in place in said jig such that said eccentrically operative rotatably adjustable backlash reduction means is rotatably mounted thereon and said latch members are operatively mounted thereon, with said eccentrically operative rotatably adjustable backlash reduction means, said latch members and said connecting members being in operative relation between said first and second hinge plates;

(m) fastening said connecting members to said first and second hinge plates such that said first and second hinge plates are rigidly connected to each other in generally parallel relation;

(n) rotationally adjusting said eccentrically operative rotatably adjustable backlash reduction means to an optimized position so as to interact with said cam assembly such that said cam assembly is moved generally toward said latch pawl means, thereby to cause selective reduction in said amount of backlash between said cam assembly and said latch pawl means and subsequently between other juxtaposed ones of said latch members;

(o) fastening said eccentrically operative rotatably adjustable backlash reduction means to said first and second hinge plates such that said optimized position is retained;

(p) fastening said rivetable fastener to said manually operable lever means and said extension arm so as to retain said manually operable lever means and said extension arm in fixed angular relation to each other; and, (q) removing said tool pin.

14. The method of claim 13, wherein said vehicle seat hinge assembly is placed into a rotating die mechanism in order to perform step (n).

* * * * *